(12) United States Patent
Hirata et al.

(10) Patent No.: US 10,444,606 B2
(45) Date of Patent: Oct. 15, 2019

(54) PROJECTION LENS ASSEMBLY METHOD AND PROJECTION IMAGE DISPLAY APPARATUS

(71) Applicant: MAXELL, LTD., Kyoto (JP)

(72) Inventors: Koji Hirata, Kyoto (JP); Masahiko Yatsu, Kyoto (JP); Yuki Matsumiya, Kyoto (JP); Shuji Kato, Kyoto (JP)

(73) Assignee: MAXELL, LTD, Kyoto (JP)

( * ) Notice: Subject to any disclaimer, the term of this patent is extended or adjusted under 35 U.S.C. 154(b) by 44 days.

(21) Appl. No.: 15/738,453

(22) PCT Filed: Jul. 17, 2015

(86) PCT No.: PCT/JP2015/070527
§ 371 (c)(1),
(2) Date: Dec. 20, 2017

(87) PCT Pub. No.: WO2017/013705
PCT Pub. Date: Jan. 6, 2017

(65) Prior Publication Data
US 2018/0224730 A1 Aug. 9, 2018

(51) Int. Cl.
*G03B 21/14* (2006.01)
*G02B 7/18* (2006.01)
(Continued)

(52) U.S. Cl.
CPC .............. *G03B 21/145* (2013.01); *G02B 7/02* (2013.01); *G02B 7/18* (2013.01); *G02B 13/18* (2013.01);
(Continued)

(58) Field of Classification Search
CPC ........ G03B 21/145; G03B 21/14; G02B 7/02; G02B 7/18; G02B 13/18; G02B 17/08;
(Continued)

(56) References Cited

U.S. PATENT DOCUMENTS 6,439,724 B1 * 8/2002 Jeon ..................... G02B 27/145
348/745
2001/0048558 A1 12/2001 Lin
(Continued)

FOREIGN PATENT DOCUMENTS

JP 2002-006398 A 1/2002
JP 2006-292900 A 10/2006
(Continued)

OTHER PUBLICATIONS

International Search Report dated Sep. 8, 2015 for the International Application No. PCT/JP2015/070527.

*Primary Examiner* — Steven Whitesell Gordon
*Assistant Examiner* — Jerry L Brooks
(74) *Attorney, Agent, or Firm* — Volpe and Koenig, P.C.

(57) ABSTRACT

Provided is a projection lens assembly method in an oblique projection optical system, which enables efficient manufacture even if a size of an image display element to be mounted varies, and a projection type image display apparatus using the projection lens. The projection lens assembly method in the oblique projection optical system for an oblique type projection image display apparatus including a block of a spherical lens and a block of an aspherical lens includes: preparing in advance the block of the spherical lens having a size that adapts to image display elements having different sizes and incorporated in the projection image display apparatus, and the block of a common aspherical lens; and assembling the block of the spherical lens selected in accordance with the sizes of the incorporated image display elements and the block of the common aspherical lens to assemble the projection lens.

4 Claims, 9 Drawing Sheets

(51) Int. Cl.
  *G02B 7/02* (2006.01)
  *G02B 13/18* (2006.01)
  *G02B 27/00* (2006.01)
  *H04N 5/74* (2006.01)
  *G02B 17/08* (2006.01)
  *G02B 27/01* (2006.01)
  *G03B 21/28* (2006.01)

(52) U.S. Cl.
  CPC ......... *G02B 17/08* (2013.01); *G02B 27/0037* (2013.01); *G02B 27/0101* (2013.01); *G02B 27/0149* (2013.01); *G03B 21/28* (2013.01); *H04N 5/74* (2013.01)

(58) Field of Classification Search
  CPC ............ G02B 27/0037; G02B 27/0101; G02B 27/0149; H04N 5/74
  USPC ....................................................... 353/100
  See application file for complete search history.

(56) References Cited

U.S. PATENT DOCUMENTS

| | | | |
|---|---|---|---|
| 2006/0227432 A1 | 10/2006 | Yoshikawa et al. | |
| 2009/0290133 A1* | 11/2009 | Yoshikawa | G02B 17/0852 353/70 |
| 2010/0097582 A1 | 4/2010 | Nagase et al. | |
| 2010/0195061 A1 | 8/2010 | Takaura et al. | |
| 2012/0081676 A1* | 4/2012 | Hirata | G02B 7/022 353/38 |
| 2013/0308106 A1 | 11/2013 | Takaura et al. | |
| 2015/0346464 A1* | 12/2015 | Imai | G02B 13/22 353/38 |

FOREIGN PATENT DOCUMENTS

| | | |
|---|---|---|
| JP | 2008-250296 A | 10/2008 |
| JP | 2009-086315 A | 4/2009 |
| JP | 2012-177846 A | 9/2012 |
| JP | 2013-235215 A | 11/2013 |

* cited by examiner

PROJECTION LENS ASSEMBLY METHOD AND PROJECTION IMAGE DISPLAY APPARATUS

TECHNICAL FIELD

The present invention relates to a projection image display apparatus including an oblique projection optical system and, more particularly, to a projection lens assembly method for the oblique projection optical system.

BACKGROUND ART

As a large-size projection type image display apparatus having a large display screen, there is known a projection type image display apparatus in which an image(s) reflected on an image display element such as a transmission type liquid crystal panel or reflection type liquid crystal panel is projected on a screen as a projection surface by a projection lens.

In recent years, there has prevailed a projection type image display apparatuses using so-called short-projection-distance projection lenses in which a distance from a screen to such an apparatus is short. For example, Patent Document 1 discloses an apparatus that includes an projection lens having: a first optical system with a transmission type refractive element; and a second optical system with a reflection type refractive element and in which some lenses of the first optical system is housed in a lower space (dead space) whose lower limit is defined by a lower end of the second optical system. In addition, Patent Document 2 discloses that a projection optical system can project a high-quality projection image onto a large screen by combining a lens system and a concave mirror even if its entire length is short.

RELATED ART DOCUMENTS

Patent Documents

Patent document 1: Japanese Patent Application Laid-open No. 2009-86315
Patent document 2: Japanese Patent Application Laid-open No. 2008-250296

SUMMARY OF THE INVENTION

Problems to be Solved by the Invention

In conventional techniques including Patent Document 1 and Patent Document 2 described above, however, single lenses divided into a plurality of blocks are generally designed and changed in consideration of their outer dimensions for each block with respect to a size of an image display element used in the apparatus. It is therefore difficult to efficiently assemble the apparatus. For this reason, there are problems of making costs for a design process and assembly of each lens block higher than anticipated and of bringing an increase in manufacturing costs for the image display apparatus.

A projection lens system (second optical system) including a free-form surface mirror particularly includes a non-axially symmetric lens as well as the free-form surface mirror. For this reason, when necessary lens blocks are to be prepared in accordance with sizes of a plurality of image display elements, it is difficult to keep the surface shapes of the respective lenses with desired molding accuracy and desired surface roughness in their manufacturing process.

Therefore, the present invention has been made in consideration of the problems in the conventional techniques described above, and relates to: an assembly method for a projection lens in an oblique projection optical system in an oblique type projection image display apparatus formed by combining lens barrel components obtained by dividing a projection lens, which obliquely enlarges and projects an image(s) reflected on an image display element, into the plurality of lens blocks; and a projection type image display apparatus using the projection lens. More specifically, the present invention has an object of providing the projection lens assembly method in an oblique projection optical system, which enables efficient manufacture by: changing outer dimensions of single lenses for each block in accordance with the sizes of the image display elements; setting lens barrels and the single lenses so as to make necessary light beams passed through in accordance with lens specifications; and allowing the lens barrels to be interchangeably combined for each block in accordance with the lens specifications, and an object of providing a projection type image display apparatus using the projection lens.

Means for Solving the Problems

According to the present invention for achieving the above objects, one of desired embodiments thereof is as follows. A projection lens assembly method in an oblique projection optical system for an oblique type projection image display apparatus having a block including a spherical lens and a block including an aspherical lens comprises: preparing in advance the block including the spherical lens and a block including a common aspherical lens, a size of the spherical lens being adapted to image display elements incorporated in the projection image display apparatus and having different sizes; and assembling the block including the spherical lens selected in accordance with the sizes of the incorporated image display elements and the block including the common aspherical lens to assemble the projection lens.

In addition, similarly to the above, according to present invention for further achieving the above objects, provided is a projection image display apparatus incorporating, in a housing, an oblique type projection image display apparatus having: a light source; an image display element modulating an intensity of light from the light source in accordance with an image signal; and a projection lens through which modulated image light from the image display element is obliquely projected onto a projection surface, the projection lens is formed by combining a plastic lens having a spherical lens surface, a plastic lens having an aspherical lens surface, and a plurality of lens blocks to be incorporated at a position nearest to a projection surface along an optical axis, and the projection lens is assembled by the above-described projection lens assembly method.

Effects of the Invention

The present invention described above has a practically beneficial effect of providing a projection lens assembly method in an oblique projection optical system and a projection type image display apparatus using the projection lens, the assembly method being able to be efficiently manufactured even if the size of the image display element incorporated in the apparatus varies.

BRIEF DESCRIPTIONS OF THE DRAWINGS

DETAILED DESCRIPTION OF PREFERRED EMBODIMENTS

Hereinafter, embodiments of the present invention will be described in detail with reference to the accompanying drawings.

Figure 1:
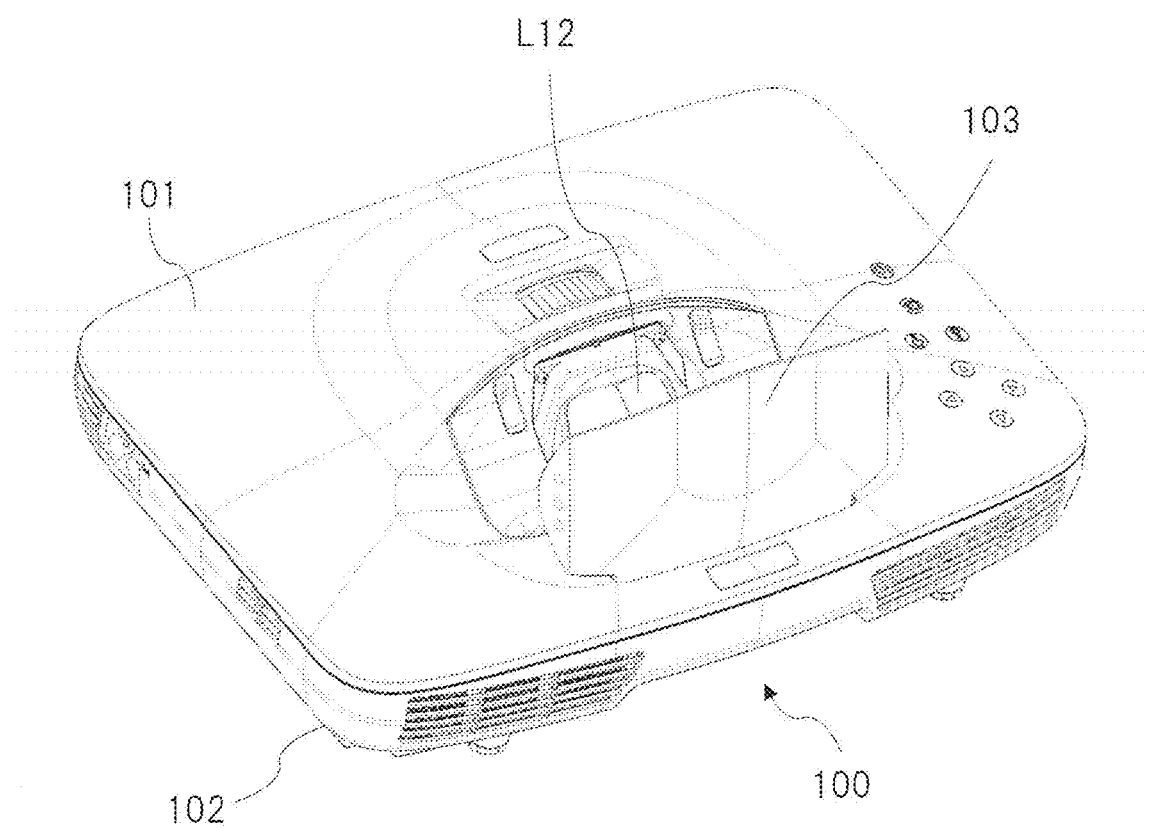
FIG. 1 is an overall perspective view showing an outer appearance of a projection type image display apparatus according to an embodiment of the present invention.

FIG. 1 is an overall perspective view showing an outer appearance of a projection type image display apparatus. Referring to FIG. 1, the reference numeral 100 denotes the projection type image display apparatus, and 101 and 102 respectively denote an upper surface cover (housing) and a lower cover (housing) of the apparatus. As evidenced also from FIG. 1, openably and closably attached to a portion of the upper surface cover 101 is a window portion 103 that is opened when the apparatus is used. Note that FIG. 1 shows the window portion 103 in an open state, and a free-form surface lens constituting a part of a projection optical system to be also described below is denoted by the reference symbol L12.

Incidentally, although not shown here, incorporated in an internal space formed by the upper surface cover 101 and the lower surface cover 102 are components for constituting the projection type image display apparatus, for example, a solid-state light source or lamp as a light source; an optical modulation unit (for example, an image display element such as a digital light processing (DLP) or liquid crystal display panel) by which light from the light source is modulated into image light based on an external image signal or the like; and an oblique projection optical system that includes so-called free-form surface lenses and free-form surface mirrors and can project the image light onto a wall surface even from a very short distance (large inclination angle) with its trapezoidal distortion etc. reduced so as to obtain an excellent projection image(s). Further incorporated are: various types of circuit components including a power supply circuit and a control circuit that supply necessary power and control signals to the above components; a cooling fan for guiding generated heat outside the apparatus; and the like.

Figure 2:
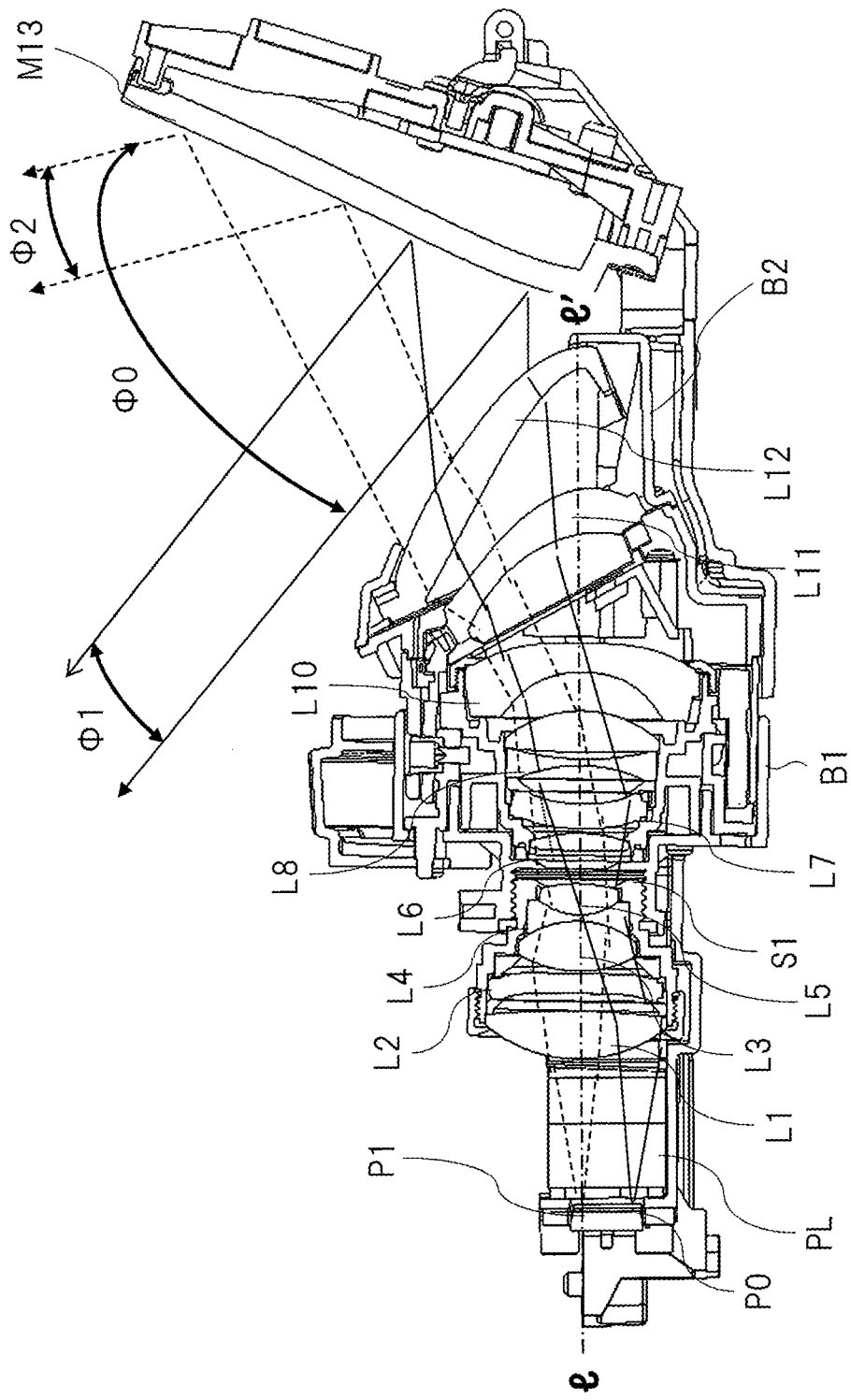
FIG. 2 is a lens arrangement diagram for explaining an example of a projection lens for an oblique projection optical system in the projection type image display apparatus in FIG. 1.

Then, FIG. 2 is a lens arrangement diagram for explaining an operation principle of the projection lens in the oblique projection optical system. As evidenced also from FIG. 2, the projection lens is constituted by twelve lenses denoted by the reference symbols L1 to L12 and one mirror denoted by the reference symbol M13. In this case, a reflective surface of the mirror M13 and lens surfaces of the lenses denoted by the reference symbols L11 and L12 each formed in a free-form surface shape. This makes it possible to obtain a projection image(s), whose trapezoidal distortion is reduced, even through an oblique projection optical system for projecting an image(s) at a very large inclination angle. A degree of freedom in design of the above free-form lens shape is about five times higher than that of an aspherical lens shape, which makes it possible to perform good aberration correction.

In addition, light from a light source (for example, a semiconductor light source (not shown) in this case) disposed on a plane facing a prism optical element denoted by the reference symbol PL in FIG. 2 is totally reflected by a prism surface, and is incident on an image display element denoted by the reference symbol P1 to be converted into an image light beam by the image display element. The converted image light beam is then transmitted through the prism surface, and incident on the projection lens. The image light beam (denoted by $\phi 0$ as a whole) from the image display element P1 (reflection type image display element) passes through different locations of the respective lenses in the projection lens with respect to an imaging position on a projection surface. The free-form surface mirror M13 and the free-form surface lenses L11 and L12 are located above an optical axis shared by most of the other lenses, thereby eliminating unnecessary lens effective areas and making it possible to be downsized. Therefore, a reduction in the cost of the overall apparatus becomes possible.

In addition, a lens surface of a lens denoted by the reference symbol L10 in FIG. 2 is made an aspherical lens to correct comatic aberration and spherical aberration. Further, since the lens denoted by the reference symbol L10 is located at a position through which a light beam obliquely passes, its lens surface is formed into an aspherical surface shape to perform high-order coma aberration caused by the light beam being obliquely incident onto the lens.

Following the aspherical lens L10, so-called free-form surface plastic lenses denoted by the reference symbols L11 and L12 and a free-form surface plastic mirror denoted by the reference symbol M13 are attached as parts of the projection lens forming the above oblique projection optical system.

Here, for the sake of descriptive convenience, FIG. 2 indicates which portions of the respective lenses (denoted by the reference symbols L1 to L12 in FIG. 2) constituting the projection lens a light beam $\phi 2$ to be imaged on an upper end portion of the projection surface and a light beam ϕ1 to be imaged on an almost middle portion of the projection surface pass through. Upper limit light of the light beam ϕ2 to be imaged on the upper end portion of the projection surface does not overlap lower limit light of the light beam ϕ1 to be imaged on almost the middle portion of the projection surface at the aspherical lens L10 and the free-form surface lenses L11 and L12, which makes it possible to perform aberration correction with respect to each light beam alone, and greatly improves its correction performance.

This tendency becomes more pronounced in the free-form surface mirror M13. The lenses (L1 to L10) contributing to the aberration correction in an area relatively close to the optical axis is incorporated in a lens barrel B1, and the lenses (L11 and L12) contributing to the aberration correction in an area distant from the optical axis is incorporated in a lens barrel B2 separate from the above lens barrel for focus adjustment, which makes it possible to adjust an interval between the lenses L10 and L11 and an interval between the lens L12 and the mirror M13 and simultaneously adjust an interval between the lenses L11 and L12.

Meanwhile, the free-form surface mirror M13 is attached to a mirror base, and has an openable and closable structure by, for example, an electric motor (not shown). In addition, all these elements are accurately fixed to a projection lens base with high accuracy, so that predetermined focus performance is obtained.

<Lens Configuration of Projection Lens System and Study Results>

Figure 3:
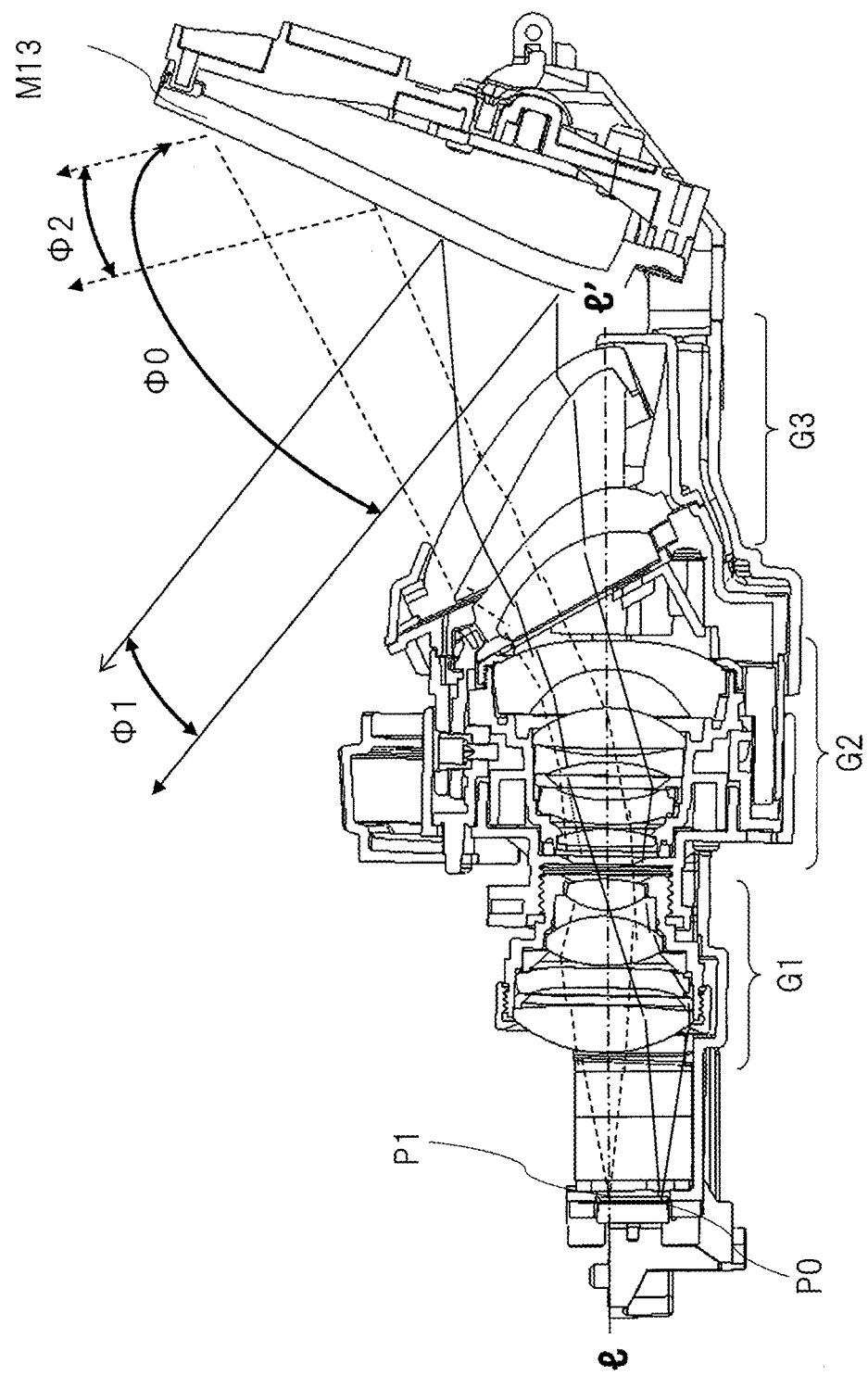
FIG. 3 is a lens arrangement diagram for explaining the projection lens configuration for the projection optical system in FIG. 2.
Figure 4:
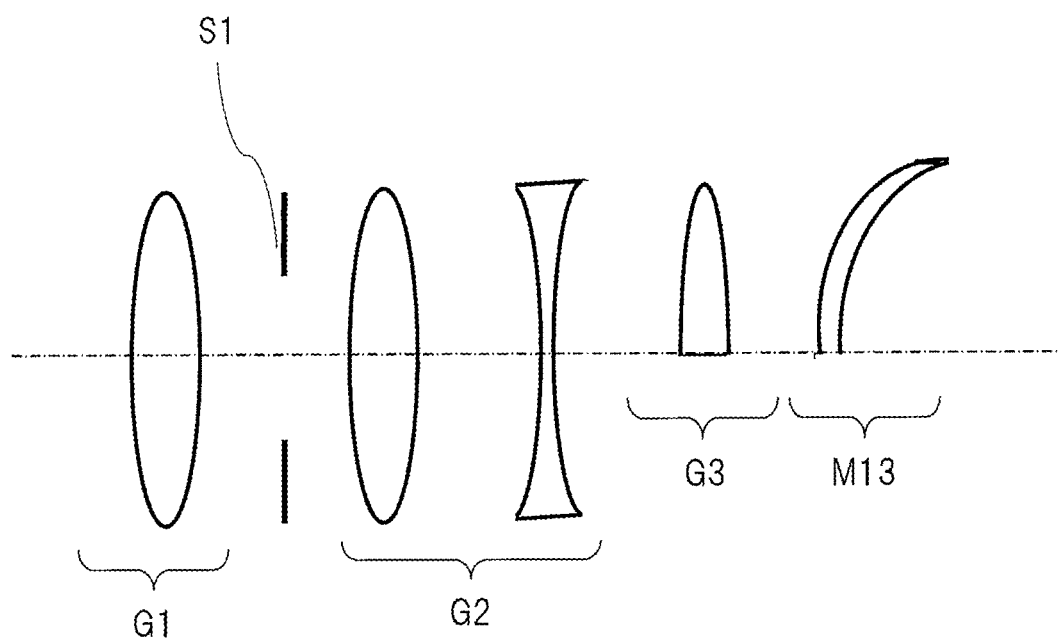
FIG. 4 is a view for explaining an operation principle of the projection lens for the projection optical system in FIG. 3.

According to the present invention, as shown in FIG. 3, the twelve lenses L1 to L12 constituting the above projection lens are divided into the following three groups, namely, a front group, a middle group, and a rear group, and the divided three groups are incorporated into individual lens barrels to form a plurality of lens blocks (a front-group lens block G1, a middle-group lens block G2, and a rear-group lens block G3). More specifically, in the above case, the aspherical lenses L11 and L12 constitute the rear-group lens block G3, the spherical lenses L1 to L5 arranged between a position closest to the image display element P1 and a position immediately before a stop S1 constitute the front-group lens block G1, and the spherical lenses L6 to L10 arranged between the stop S1 and a position immediately before the aspherical lens L11 constitute the middle-group lens block G2. Note that FIG. 4 shows the lens arrangement of these lenses constituting the projection lens in the form of the respective lens blocks (groups).

A plurality of image display elements P1 (including semiconductor light sources P0) having different sizes are prepared. The above-described lens blocks (front-group lens blocks G1, middle-group lens blocks G2, and rear-group lens blocks G3) and the free-form surface mirrors M13 (the free-form surface mirror M13 is shown as a lens in FIG. 4) are designed and made in advance in accordance with the sizes of the respective elements, and are appropriately selected and assembled. Thus, the projection type image display apparatus having the image display elements P1 different in size is manufactured, and its performance is checked. As a result, it has been found that desired optical performance is not always obtained even if the front-group lens block G1, the middle-group lens block G2, the rear-group lens block G3, and the free-form surface mirror M13 are designed and made in accordance with the size of the image display element P1. For this reason, the prevent inventors have made various studies and confirmed the following.

First of all, with regard to the front-group lens block G1 and the middle-group lens block G2 each obtained by combining the plurality of spherical lenses, it has been found that the desired optical performance can be obtained by selecting lens blocks having lens diameters corresponding to the image display elements P1 having different sizes (that is, selecting a lens block having a small lens diameter corresponding to the image display element P1 having a small size, and a lens block having a large lens diameter corresponding to the image display element P1 having a large size) if the respective lens blocks are designed to make the light beams ϕ1 and ϕ2 from the image display element P1 fall within effective diameters of the spherical and aspherical lenses.

With regard to the rear-group lens block G3 constituted by the free-form surface lenses, desired process accuracy in different manufacturing processes is difficult to maintain for complexity of their surface shapes. It has been therefore found that the desired optical performance cannot be obtained only by its size change similar to that of the front-group lens block G1 or the middle-group lens block G2 constituted by aspherical and spherical lenses.

The present invention has been made on the basis of the above study results. That is, it has been found that the front-group lens block G1 or the middle-group lens block G2 corresponding to the size is selected with respect to the image display elements P1 different in size, and the rear-group lens block G3 is set as a common block to the image display elements P1 different in size, which makes it possible to maintain the desired shape accuracy and surface roughness and to efficiently assemble the projection lens system from which the desired optical performance is obtained.

Incidentally, since the common block is used as the rear-group lens block G3, the block is designed so that the light beams ϕ1 and ϕ2 from the image display element P1 having the largest size fall within the free-form surface lens of the block.

Further, also regarding the free-form surface mirror M13, it has been found that desired optical performance can be obtained only by its size change similar to that of the front-group lens block G1 or the middle-group lens block G2 constituted by the spherical lenses. On the other hand, a reflective surface of the mirror M13 is ½ or less in surface roughness to be required than the lens surface of the above free-form surface lens, and hence shape accuracy equivalent to that of the above rear-group lens block G3 is required. In addition, when a reflective film is to be formed by vapor deposition, cost for the vapor deposition greatly changes depending on a size of the mirror M13, which greatly influences the cost of the projection lens. For this reason, when a small image display element is to be used, a mirror to be used may preferably have the minimum necessary outer dimensions.

The embodiment will be described in more detail below. First of all, a reflection type image display element having a diagonal dimension of 0.3 inch (aspect ratio of 16:9) and a reflection type image display element having a diagonal dimension of 0.45 inch (aspect ratio of 16:9) are prepared as image display elements having different diagonal dimensions. FIGS. 5 to 9 and Tables 1 to 5 given below show, in terms of X-Y coordinate values, the study results regarding which areas of the aspherical lenses, free-form surface lenses, and free-form surface mirrors constituting the projection lens shown in FIG. 2 the image light beams from images displayed by the reflection type image display element having a diagonal dimension of 0.3 inch (aspect ratio of 16:9) and by the reflection type image display element having a diagonal dimension of 0.45 inch (aspect ratio of 16:9) pass through or are reflected on.

Figure 5:
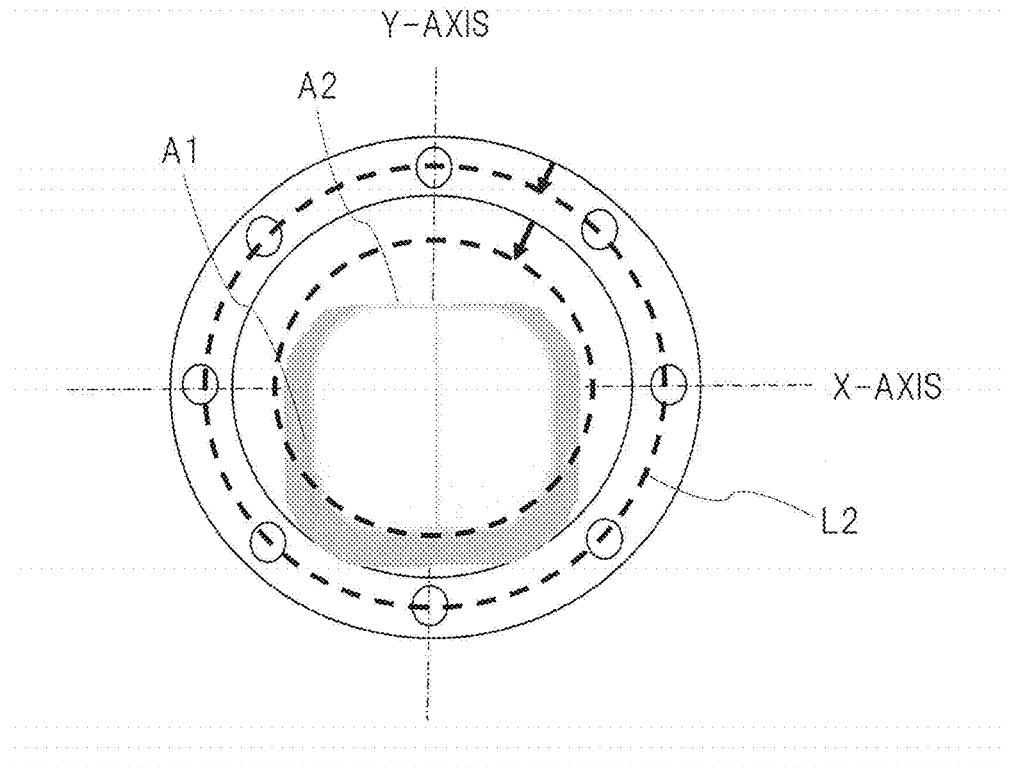
FIG. 5 is a plan view showing an area of passing an image light beam in an incident surface of an aspherical lens constituting a front-group lens block, the front-group lens block being composed of the aspherical lens and a spherical lens shown in FIG. 2.

FIG. 5 is a plan showing an area of passing an image light beam in an incident surface (a side of the image display element) of the aspherical lens L2 constituting the front-group lens block G1, the front-group lens block being composed of the aspherical lens and a spherical lens shown in FIG. 2. An area A1 illustrated in FIG. 5 corresponds to the image display element having a diagonal dimension of 0.45 inch, and an area A2 illustrated in FIG. 5 corresponds to the image display element having a diagonal dimension of 0.3 inch. Incidentally, Table 1 shows a sequence of points corresponding to one surface, that is, +X-axis relative to a Y-axis of a specific passing area in terms of absolute values with reference to the optical axis (zero on both X- and Y-axes).

TABLE 1

■ ASPHERICAL LENS: L2 INCIDENT SURFACE

| 0.30 INCH | | 0.45 INCH | |
|---|---|---|---|
| X-AXIS | Y-AXIS | X-AXIS | Y-AXIS |
| 0 | 2.9 | 0 | 2.9 |
| −0.51 | 2.9 | −0.72 | 2.9 |
| −1.03 | 2.9 | −1.43 | 2.89 |
| −1.54 | 2.89 | −2.15 | 2.89 |
| −2.06 | 2.89 | −2.88 | 2.89 |
| −2.57 | 2.89 | −3.61 | 2.88 |
| −3.15 | 2.83 | −4.19 | 2.81 |
| −3.71 | 2.67 | −4.75 | 2.64 |
| −4.22 | 2.41 | −5.26 | 2.38 |
| −4.68 | 2.07 | −5.71 | 2.02 |
| −5.07 | 1.65 | −6.09 | 1.6 |
| −5.38 | 1.18 | −6.39 | 1.13 |
| −5.61 | 0.66 | −6.6 | 0.62 |
| −5.74 | 0.12 | −6.72 | 0.1 |
| −5.79 | −0.43 | −6.76 | −0.44 |
| −5.79 | −0.73 | −6.76 | −0.91 |
| −5.79 | −1.04 | −6.77 | −1.38 |
| −5.79 | −1.34 | −6.77 | −1.86 |
| −5.79 | −1.65 | −6.77 | −2.33 |
| −5.79 | −1.95 | −6.78 | −2.81 |
| −5.79 | −2.26 | −6.78 | −3.3 |
| −5.79 | −2.57 | −6.79 | −3.79 |
| −5.79 | −2.87 | −6.79 | −4.29 |
| −5.79 | −3.19 | −6.8 | −4.8 |
| −5.8 | −3.5 | −6.8 | −5.32 |
| −5.71 | −4.05 | −6.59 | −5.84 |
| −5.54 | −4.57 | −6.33 | −6.28 |
| −5.28 | −5.05 | −6.01 | −6.62 |
| −4.97 | −5.47 | −5.68 | −6.9 |
| −4.59 | −5.83 | −5.35 | −7.15 |
| −4.17 | −6.13 | −5.03 | −7.38 |
| −3.7 | −6.36 | −4.69 | −7.6 |
| −3.2 | −6.52 | −4.31 | −7.83 |
| −2.66 | −6.6 | −3.88 | −8.06 |
| −2.12 | −6.6 | −3.09 | −8.16 |
| −1.59 | −6.6 | −2.3 | −8.16 |
| −1.06 | −6.6 | −1.53 | −8.15 |
| −0.53 | −6.59 | −0.76 | −8.15 |
| 0 | −6.59 | 0 | −8.14 |

As evidenced also from the above drawings and table, with regard to the lenses constituting the front-group lens block G1, it is understood that lenses (see broken line circles in FIG. 5) having different lens diameters (that is, reduced lens diameters) can be adopted appropriately so as to adapt to a size of an image display element.

Figure 6:
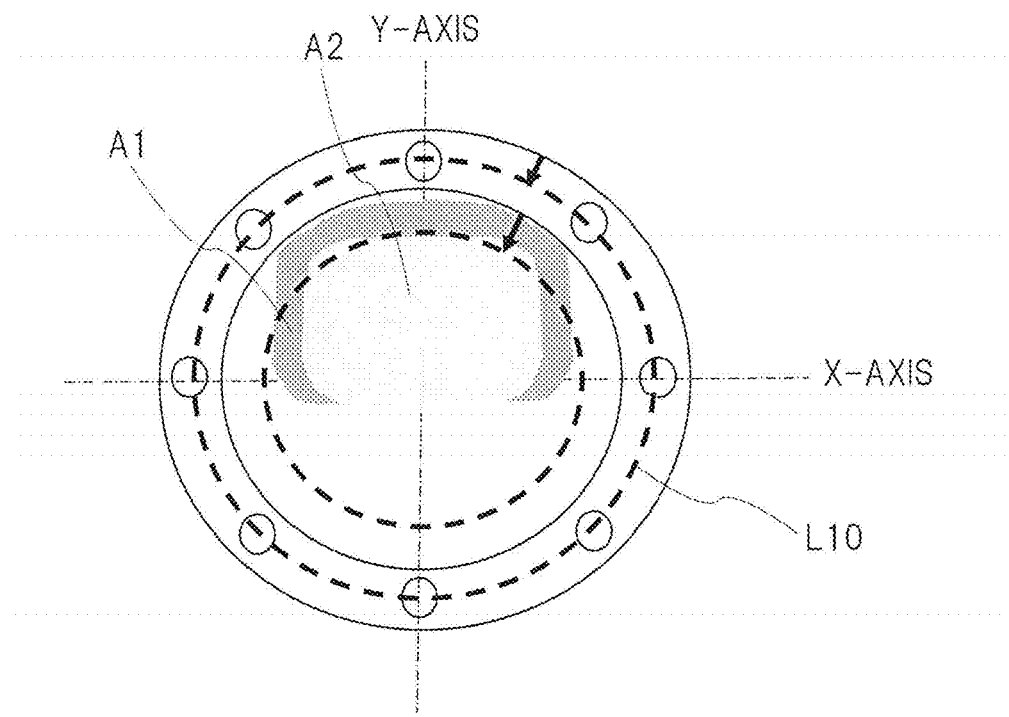
FIG. 6 is a plan view showing an area of passing an image light beam in an incident surface of an aspherical lens constituting a middle-group lens block shown in FIG. 2.

Likewise, FIG. 6 is a plan showing an area of passing an image light beam in an incident surface (a side of the image display element) of the aspherical lens L10 constituting the middle-group lens block G2 shown in FIG. 2. An area A1 illustrated in FIG. 6 corresponds to the image display element having a diagonal dimension of 0.45 inch, and an area A2 illustrated in FIG. 6 corresponds to the image display element having a diagonal dimension of 0.3 inch. Incidentally, Table 2 described below shows a sequence of points corresponding to one surface, that is, +X-axis relative to the Y-axis of a specific passing area in terms of absolute values with reference to the optical axis (zero on both X- and Y-axes).

TABLE 2

■ ASPHERICAL LENS: L10 INCIDENT SURFACE

| 0.30 INCH | | 0.45 INCH | |
|---|---|---|---|
| X-AXIS | Y-AXIS | X-AXIS | Y-AXIS |
| 0 | −1.21 | 0 | −1.21 |
| 0.74 | −1.21 | 1.03 | −1.2 |
| 1.47 | −1.2 | 2.06 | −1.2 |
| 2.2 | −1.2 | 3.06 | −1.2 |
| 2.93 | −1.2 | 4.05 | −1.21 |
| 3.63 | −1.21 | 4.99 | −1.22 |
| 4.08 | −1.16 | 5.44 | −1.17 |
| 4.51 | −1.03 | 5.86 | −1.04 |
| 4.9 | −0.83 | 6.25 | −0.84 |
| 5.25 | −0.56 | 6.59 | −0.56 |
| 5.54 | −0.24 | 6.87 | −0.24 |
| 5.76 | 0.12 | 7.08 | 0.12 |
| 5.92 | 0.51 | 7.23 | 0.51 |
| 6 | 0.92 | 7.31 | 0.91 |
| 6.02 | 1.34 | 7.33 | 1.32 |
| 6.02 | 1.76 | 7.32 | 1.95 |
| 6.01 | 2.18 | 7.3 | 2.58 |
| 6 | 2.59 | 7.28 | 3.2 |
| 5.99 | 3.01 | 7.26 | 3.8 |
| 5.98 | 3.41 | 7.23 | 4.4 |
| 5.97 | 3.82 | 7.19 | 4.98 |
| 5.96 | 4.21 | 7.16 | 5.54 |
| 5.94 | 4.61 | 7.12 | 6.09 |
| 5.93 | 4.99 | 7.08 | 6.62 |
| 5.91 | 5.37 | 6.76 | 7.14 |
| 5.83 | 5.78 | 6.37 | 7.48 |
| 5.69 | 6.16 | 6.08 | 7.71 |
| 5.49 | 6.52 | 5.84 | 7.89 |
| 5.24 | 6.83 | 5.64 | 8.03 |
| 4.95 | 7.09 | 5.46 | 8.16 |
| 4.62 | 7.31 | 5.28 | 8.28 |
| 4.27 | 7.48 | 5.09 | 8.39 |
| 3.89 | 7.6 | 4.88 | 8.52 |
| 3.49 | 7.66 | 4.64 | 8.66 |
| 2.81 | 7.68 | 3.76 | 9.06 |
| 2.12 | 7.7 | 2.85 | 9.29 |
| 1.42 | 7.72 | 1.91 | 9.38 |
| 0.71 | 7.73 | 0.96 | 9.43 |
| 0 | 7.73 | 0 | 9.44 |

Also in this case, with regard to the aspherical lenses constituting the middle-group lens block G2 similarly to the front-group lens block G1 described above, it is understood that lenses (see broken line circles in FIG. 6) having different lens diameters can be adopted appropriately so as to adapt to a size of an image display element.

Figure 7:
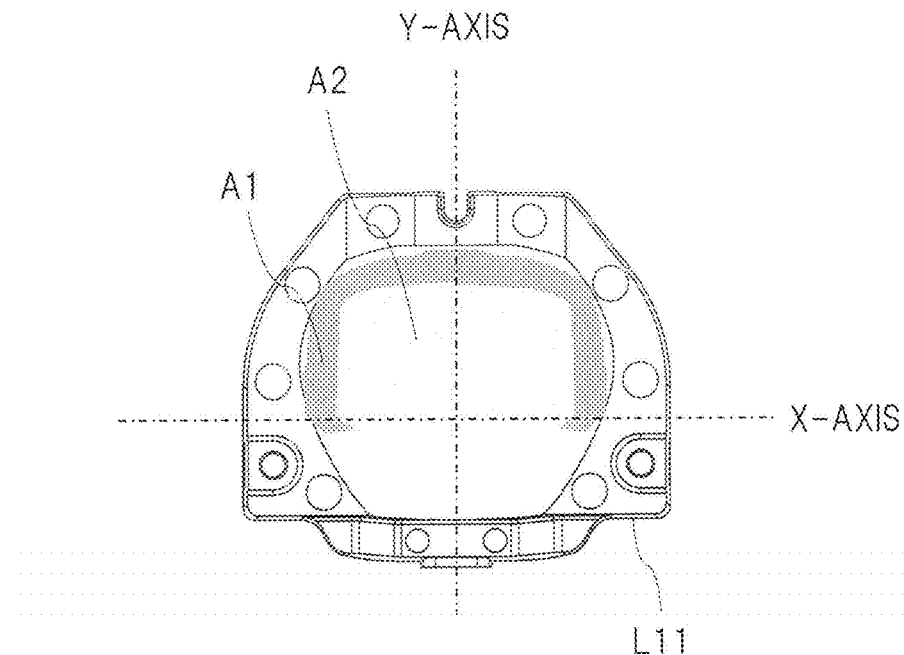
FIG. 7 is a plan view showing an example of an area of passing an image light beam in an incident surface of a free-form surface lens constituting a rear-group lens block shown in FIG. 2.

FIG. 7 is a plan showing an area of passing an image light beam in an incident surface of the free-form surface lens L11 constituting the rear-group lens block G3 shown in FIG. 2. An area shown by A1 in FIG. 7 corresponds to the image display element having a diagonal dimension of 0.45 inch, and an area shown by A2 in FIG. 7 corresponds to the image display element having a diagonal dimension of 0.3 inch. In addition, Table 3 described below shows a sequence of points corresponding to one surface, that is, +X-axis relative to the Y-axis of a specific passing area in terms of absolute values with reference to the optical axis (zero on both X- and Y-axes).

TABLE 3

■ FREE-FORM SURFACE LENS (L11A)

| 0.30 INCH | | 0.45 INCH | |
|---|---|---|---|
| X-AXIS | Y-AXIS | X-AXIS | Y-AXIS |
| 0 | −0.3 | 0 | −0.3 |
| 1.42 | −0.31 | 1.98 | −0.32 |
| 2.88 | −0.27 | 4.01 | −0.31 |
| 4.29 | −0.32 | 5.92 | −0.39 |
| 5.66 | −0.38 | 7.71 | −0.51 |
| 6.97 | −0.45 | 9.32 | −0.65 |
| 7.33 | −0.42 | 9.69 | −0.62 |
| 7.67 | −0.33 | 10.05 | −0.53 |
| 7.98 | −0.18 | 10.37 | −0.37 |
| 8.26 | 0.02 | 10.67 | −0.15 |
| 8.5 | 0.27 | 10.91 | 0.12 |
| 8.69 | 0.55 | 11.11 | 0.42 |
| 8.82 | 0.86 | 11.24 | 0.75 |
| 8.89 | 1.18 | 11.32 | 1.08 |
| 8.91 | 1.51 | 11.34 | 1.43 |
| 8.89 | 2.31 | 11.3 | 2.6 |
| 8.86 | 3.1 | 11.23 | 3.75 |
| 8.83 | 3.88 | 11.14 | 4.85 |
| 8.79 | 4.63 | 11.02 | 5.9 |
| 8.75 | 5.37 | 10.88 | 6.89 |
| 8.7 | 6.08 | 10.73 | 7.82 |
| 8.64 | 6.76 | 10.56 | 8.68 |
| 8.58 | 7.42 | 10.38 | 9.47 |
| 8.52 | 8.05 | 10.19 | 10.19 |
| 8.45 | 8.64 | 9.73 | 10.88 |
| 8.38 | 9 | 9.34 | 11.18 |
| 8.25 | 9.34 | 9.05 | 11.39 |
| 8.07 | 9.65 | 8.82 | 11.55 |
| 7.84 | 9.92 | 8.62 | 11.68 |
| 7.58 | 10.16 | 8.44 | 11.8 |
| 7.28 | 10.35 | 8.26 | 11.9 |
| 6.96 | 10.5 | 8.08 | 12.01 |
| 6.62 | 10.6 | 7.88 | 12.13 |
| 6.26 | 10.65 | 7.64 | 12.26 |
| 5.1 | 10.77 | 6.25 | 12.8 |
| 3.87 | 10.87 | 4.78 | 13.17 |
| 2.66 | 11.1 | 3.24 | 13.38 |
| 1.34 | 11.15 | 1.66 | 13.68 |
| 0 | 11.16 | 0 | 13.73 |

Figure 8:
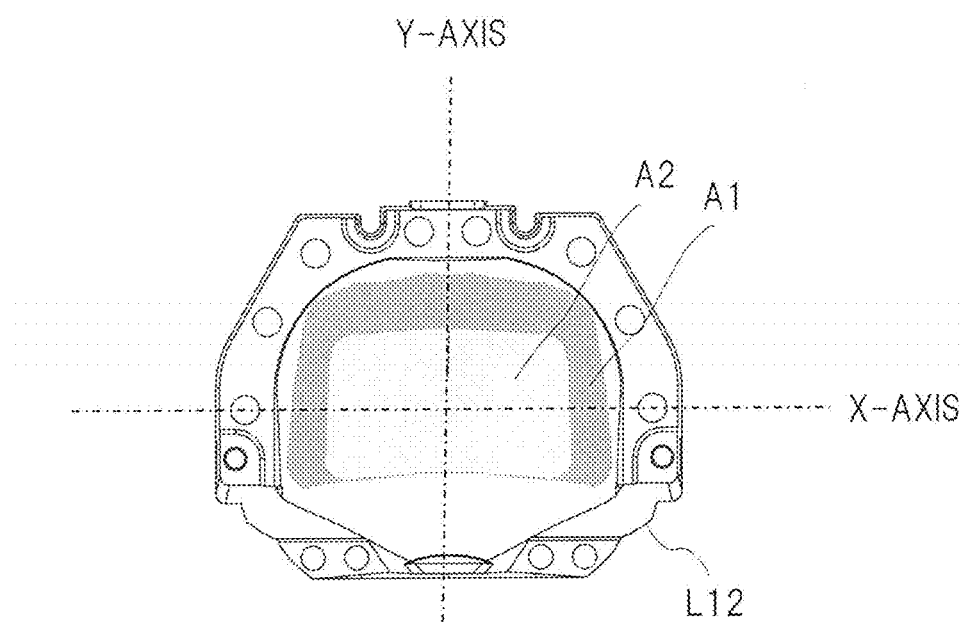
FIG. 8 is a plan view showing another example of an area of passing an image light beam in an incident surface of the free-form surface lens constituting the rear-group lens block shown in FIG. 2.

FIG. 8 also shows an area of passing an image light beam in an incident surface of the free-form surface lens L12 constituting the rear-group lens block G3 shown in FIG. 2. An area shown by A1 in FIG. 8 corresponds to the image display element having a diagonal dimension of 0.45 inch, and an area shown by A2 in FIG. 8 corresponds to the image display element having a diagonal dimension of 0.3 inch. In addition, Table 4 described below shows a sequence of points corresponding to one surface, that is, +X-axis relative to the Y-axis of a specific passing area in terms of absolute values with reference to the optical axis (zero on both X- and Y-axes).

TABLE 4

■ FREE-FORM SURFACE LENS (L12A)

| 0.30 INCH | | 0.45 INCH | |
|---|---|---|---|
| X-AXIS | Y-AXIS | X-AXIS | Y-AXIS |
| 0 | −5.71 | 0 | −5.71 |
| 1.87 | −5.74 | 2.64 | −5.73 |
| 3.77 | −5.79 | 5.27 | −5.89 |
| 5.65 | −5.91 | 7.9 | −6.12 |
| 7.53 | −6.08 | 10.46 | −6.42 |
| 9.39 | −6.29 | 12.86 | −6.76 |
| 9.7 | −6.27 | 13.25 | −6.76 |
| 10 | −6.22 | 13.63 | −6.7 |
| 10.29 | −6.12 | 13.99 | −6.58 |

TABLE 4-continued

■ FREE-FORM SURFACE LENS (L12A)

| 0.30 INCH | | 0.45 INCH | |
|---|---|---|---|
| X-AXIS | Y-AXIS | X-AXIS | Y-AXIS |
| 10.56 | −5.98 | 14.31 | −6.41 |
| 10.79 | −5.8 | 14.58 | −6.2 |
| 10.97 | −5.6 | 14.78 | −5.95 |
| 11.11 | −5.37 | 14.92 | −5.68 |
| 11.2 | −5.13 | 15 | −5.39 |
| 11.23 | −4.88 | 15.01 | −5.09 |
| 11.24 | −3.78 | 14.88 | −3.45 |
| 11.23 | −2.69 | 14.75 | −1.86 |
| 11.21 | −1.63 | 14.6 | −0.35 |
| 11.18 | −0.61 | 14.43 | 1.09 |
| 11.13 | 0.38 | 14.23 | 2.44 |
| 11.07 | 1.33 | 14.01 | 3.7 |
| 11 | 2.23 | 13.79 | 4.88 |
| 10.91 | 3.09 | 13.55 | 5.98 |
| 10.82 | 3.91 | 13.32 | 7.02 |
| 10.72 | 4.68 | 12.77 | 7.95 |
| 10.68 | 5.04 | 12.35 | 8.24 |
| 10.56 | 5.38 | 12.04 | 8.44 |
| 10.39 | 5.69 | 11.79 | 8.58 |
| 10.18 | 5.95 | 11.58 | 8.71 |
| 9.91 | 6.17 | 11.39 | 8.81 |
| 9.62 | 6.35 | 11.2 | 8.91 |
| 9.29 | 6.48 | 11 | 9.01 |
| 8.94 | 6.55 | 10.79 | 9.12 |
| 8.57 | 6.57 | 10.53 | 9.24 |
| 6.96 | 6.69 | 8.56 | 9.77 |
| 5.28 | 6.79 | 6.5 | 10.1 |
| 3.55 | 6.86 | 4.38 | 10.26 |
| 1.81 | 7.04 | 2.22 | 10.52 |
| 0 | 7.06 | 0 | 10.56 |

Incidentally, it is understood from FIGS. 7 and 8 that the free-form surface lenses L11 and L12 constituting the rear-group lens block G3 have complex surface shapes, which does not necessarily lead to a reduction in their lens diameters even if the size of the image display element is reduced. The complexity of the surface shapes of the free-form surface lenses L11 and L12 makes it difficult to obtain desired characteristics only by changing the sizes (reducing the lens diameters). In addition, as described above, it is difficult to maintain desired process accuracy in different manufacturing processes. For those reasons, it is impossible to obtain desired optical performance only by simply reducing each lens diameter.

Figure 9:
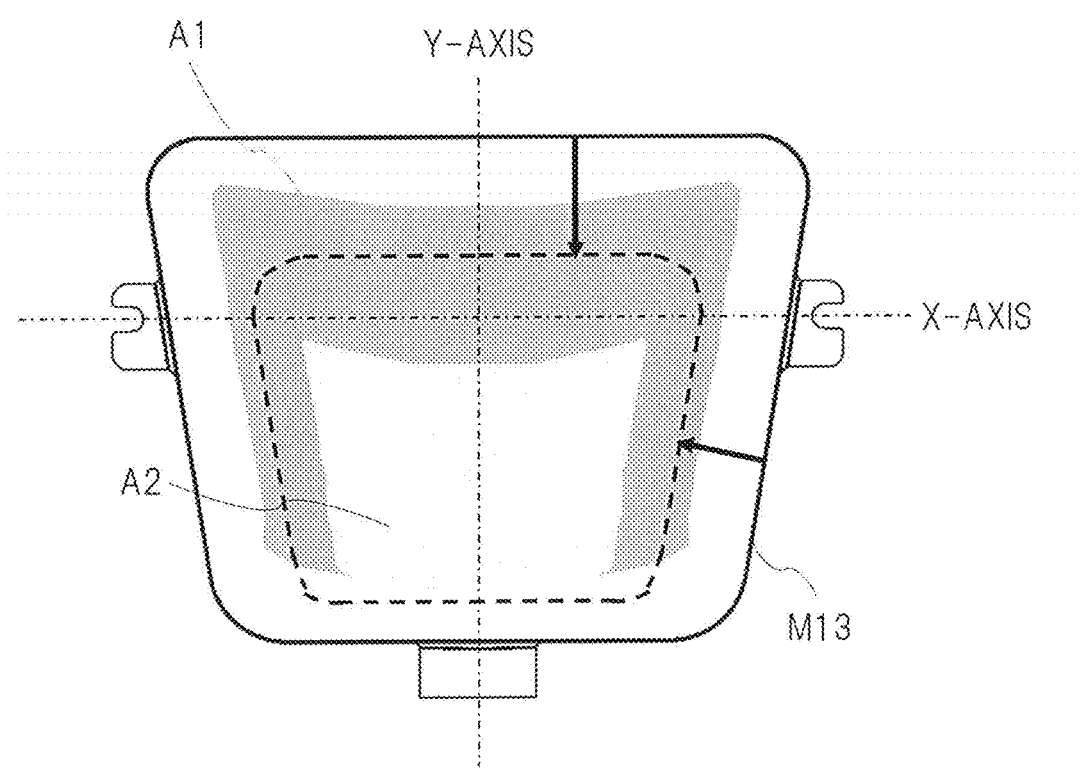
FIG. 9 is a plan view showing an area of passing an image light beam in a reflective surface of a free-form surface mirror shown in FIG. 2.

FIG. 9 is a plan view showing an area of passing an image light beam in a reflective surface of the free-form surface mirror M13 shown in FIG. 2. The same description applies to the areas shown by A1 and A2 in FIG. 9, and hence their description will be omitted. Table 5 describe below shows a sequence of points corresponding to one surface, that is, +X-axis relative to the Y-axis of a specific passing area in terms of absolute values with reference to the optical axis (zero on both X- and Y-axes).

TABLE 5

■ FREE-FORM SURFACE LENS (M13)

| 0.30 INCH | | 0.45 INCH | |
|---|---|---|---|
| X-AXIS | Y-AXIS | X-AXIS | Y-AXIS |
| 0 | −36.85 | 0 | −36.85 |
| 3.12 | −36.76 | 4.36 | −36.72 |
| 6.25 | −36.62 | 8.77 | −36.43 |
| 9.43 | −36.37 | 13.37 | −35.87 |
| 12.72 | −35.96 | 18.4 | −34.99 |

TABLE 5-continued

■ FREE-FORM SURFACE LENS (M13)

| 0.30 INCH | | 0.45 INCH | |
|---|---|---|---|
| X-AXIS | Y-AXIS | X-AXIS | Y-AXIS |
| 16.21 | −35.4 | 24.14 | −33.85 |
| 16.56 | −35.26 | 24.77 | −33.62 |
| 16.93 | −35.08 | 25.43 | −33.35 |
| 17.28 | −34.88 | 26.06 | −33.05 |
| 17.62 | −34.66 | 26.65 | −32.74 |
| 17.92 | −34.44 | 27.16 | −32.43 |
| 18.19 | −34.2 | 27.59 | −32.12 |
| 18.4 | −33.98 | 27.92 | −31.83 |
| 18.56 | −33.76 | 28.15 | −31.56 |
| 18.66 | −33.57 | 28.28 | −31.31 |
| 18.85 | −31.34 | 28.71 | −27.49 |
| 19.09 | −29.02 | 29.28 | −23.53 |
| 19.37 | −26.61 | 29.95 | −19.38 |
| 19.68 | −24.1 | 30.7 | −15 |
| 20.03 | −21.48 | 31.5 | −10.33 |
| 20.42 | −18.72 | 32.35 | −5.36 |
| 20.83 | −15.83 | 33.24 | −0.1 |
| 21.27 | −12.81 | 34.18 | 5.43 |
| 21.73 | −9.65 | 35.16 | 11.23 |
| 22.21 | −6.35 | 35.58 | 16.66 |
| 22.51 | −5.53 | 35.37 | 16.97 |
| 22.71 | −4.84 | 35.21 | 17.17 |
| 22.81 | −4.27 | 35.07 | 17.31 |
| 22.82 | −3.85 | 34.94 | 17.41 |
| 22.74 | −3.58 | 34.83 | 17.5 |
| 22.58 | −3.44 | 34.71 | 17.58 |
| 22.33 | −3.46 | 34.58 | 17.66 |
| 21.99 | −3.62 | 34.44 | 17.73 |
| 21.58 | −3.94 | 34.27 | 17.8 |
| 16.93 | −5.12 | 27.25 | 17.08 |
| 12.5 | −6.07 | 20.23 | 16.12 |
| 8.23 | −6.76 | 13.32 | 15.07 |
| 4.12 | −6.87 | 6.66 | 14.92 |
| 0 | −7.02 | 0 | 15.13 |

Incidentally, also in this case, it is understood that mirrors (see the broken line in FIG. 9) having different sizes (that is, reduced in overall sizes) can be adopted appropriately so as to adapt to the size of the image display element.

It is understood from the above description that the assembly of the projection lens system is effective, in order to efficiently and economically assemble projection lens systems, by appropriately selecting not only the above-described front-group lens blocks G1 and/or middle-group lens blocks G2 but also the free-form surface mirrors M13 with respect to the image display elements P1 different in size. Incidentally, in the manufacture of the mirror M13, an area of a reflective film to be deposited on the reflective surface can also be reduced appropriately in accordance with the size of the small image display element P1, which brings a great influence on a reduction in manufacturing cost. Thus, an economical effect can be obtained.

<Assembly Method of Projection Lens System>

As evidenced from the above description, according to the assembly method of the projection lens system that becomes the present invention, prepared in advance are a plurality of types of lens blocks, i.e., a front-group lens blocks G1 and a middle-group lens blocks G2 designed and manufactured so as to adapt to sizes of a plurality of image display elements P1 having different sizes (diagonal dimensions) and incorporated in a projection type image display apparatus to be manufactured. In addition, a plurality of types of free-form surface mirrors M13 are prepared in advance in the same manner. Incidentally, the rear-group lens blocks G3 described above are prepared as common components.

Figure 10:
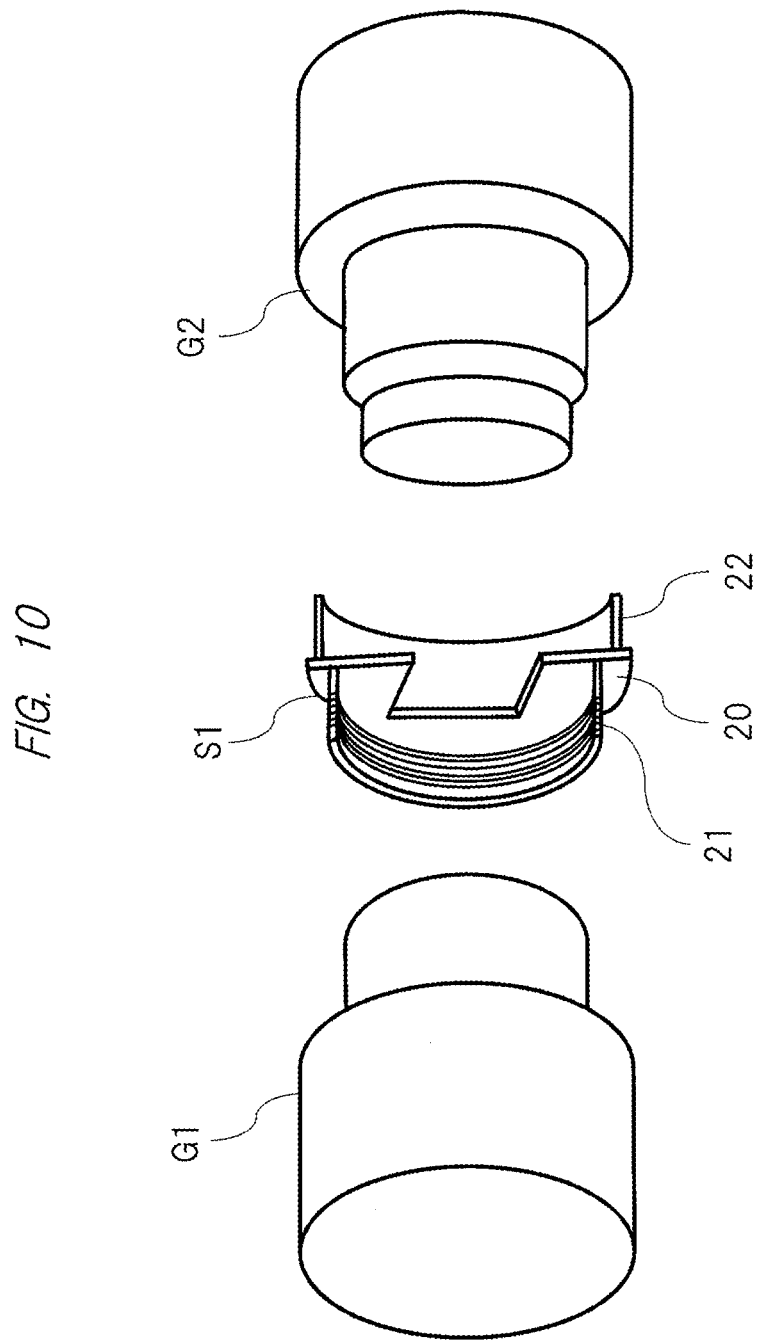
FIG. 10 is a view for explaining an assembly process of a projection lens for an oblique projection optical system shown in FIG. 3.

Then, as shown in FIG. 10 in assembling a projection lens, selected and assembled are the front-group lens block G1 and the middle-group lens block G2 that adapt to the image display element P1 selectively incorporated in an image display apparatus. In addition, the assembled blocks are combined with the common rear-group lens block G3 to constitute a lens group. The lens groups formed in this manner are mounted in an internal space formed by the upper surface cover 101 and the lower surface cover 102, together with various types of components constituting a projection type image display apparatus. In addition, the free-form surface mirror M13 selected in the same manner as described above is attached to the mirror base, and the assembly of the projection lens is completed.

Figure 11:
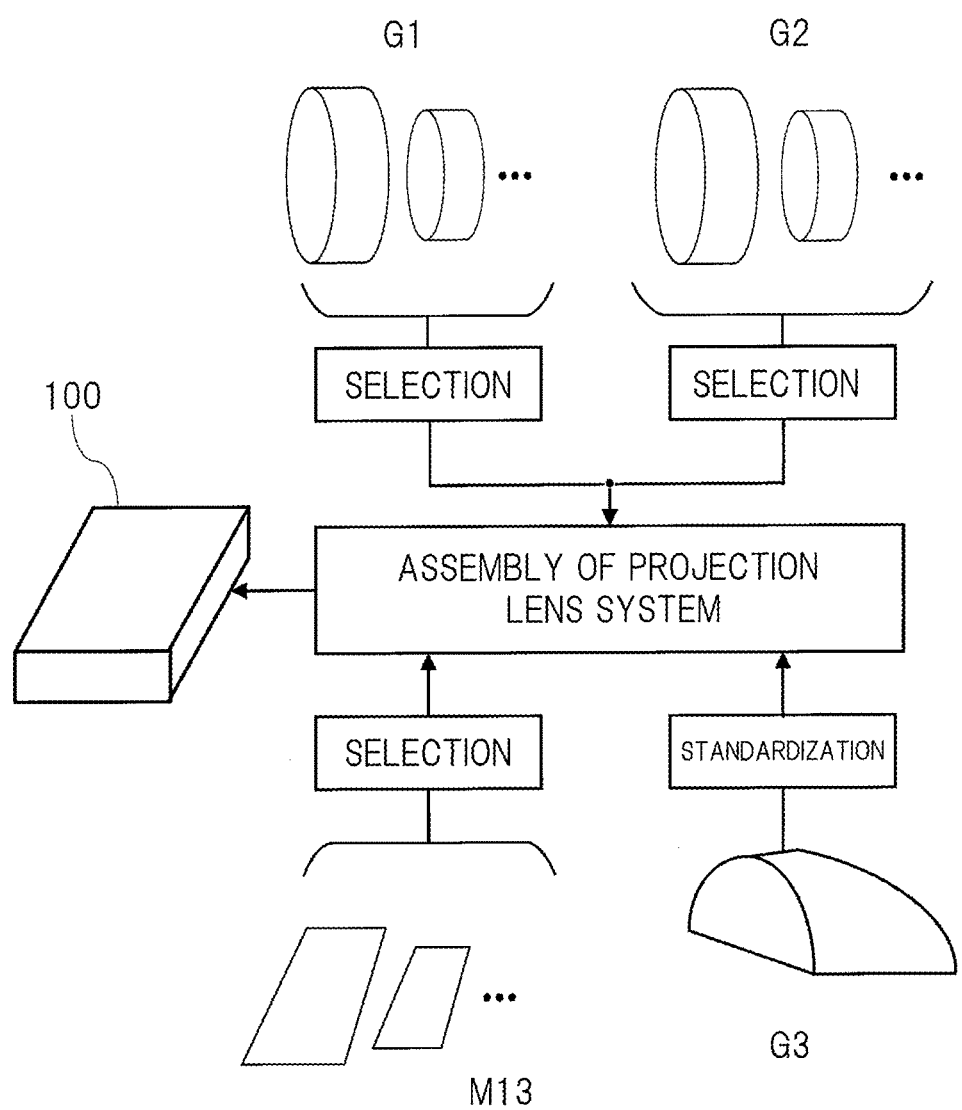
FIG. 11 is a view showing an example of an assembly structure of the front-group lens block and the middle-group lens block in the projection lens for the oblique projection optical system shown in FIG. 3.

Incidentally, at this time, when the front-group lens block G1 and the middle-group lens block G2 are assembled, as also shown in FIG. 11, a member formed by lens barrels 21 and 22 integrally elongating back and forth from the stop S1 (20) is used so that the lens barrel at a rear of the front-group lens block G1 is screwed through or inserted into the front portion 21, and the lens barrel at a front of the middle-group lens block G2 is screwed through or inserted into the rear portion 22. That is, this assembly structure makes it possible to easily assemble the front-group lens block G1 and the middle-group lens block G2 by fixing them at predetermined positions on the same optical axis with respect to the stop S1. Incidentally, like the above front-group lens blocks G1 and middle-group lens blocks G2, stops 20 having a plurality of sizes and including the lens barrels 21 and 22 shown in FIG. 10 are prepared in advance so as to adapt to the image display elements P1 selectively incorporated in projection type image display apparatuses.

That is, according to the above projection lens assembly method, the rear-group lens block G3 difficult to particularly maintain desired process accuracy is standardized regardless of the size of the image display element P1, and thereby the projection lens system from which desired optical performance is obtained. On the other hand, the front-group lens block G1 and the middle-group lens block G2 are selected and assembled in accordance with the size of the image display element P1, and thereby outer sizes of the front-group lens block G1, the middle-group lens block G2, and the free-form surface mirror M13 can be particularly reduced with respect to the image display element P1 having a small size, so that its manufacturing cost can be reduced. Further, a second effect obtained by reducing the outer sizes of the front-group lens block G1 and the middle-group lens block G2 is to be able to ensure a sufficient cooling path in the projection type image display apparatus and implement natural cooling by external air, which also contributes to an improvement in apparatus performance.

The embodiment in which the stop 20, the middle-group lens block G2, and the front-group lens block G1 are separate has been described above. Needless to say, however, even if the embodiment has such a structure that the stop 20 is integrated with the middle-group lens block G2 or the front-group lens block G1 and the other lens block is interchangeable in consideration of structural limitations, similar effects can be obtained.

More specifically, with regard to the image display elements P1 having different sizes (diagonal dimensions or the like) which are incorporated in the projection type image display apparatus to be manufactured, part of lens blocks, for example, only the front-group lens block G1 may be variable in accordance with variations in the sizes of the elements. More specifically, a plurality of front-group lens blocks having different sizes may be prepared or all of them may be changeable. That is, the front-group lens blocks G1 different in size, the middle-group lens blocks G2 different in size, and the free-form surface mirrors M13 different in size may be prepared.

Note that the present invention is not limited to the embodiments described above and includes various modification examples. For example, the embodiments above have described the whole of the system in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

100 . . . projection type image display apparatus; 101 . . . upper surface cover; 102 . . . lower surface cover; L1 to L12 . . . lens; P1 . . . image display element; PL . . . prism optical element; G1 . . . front-group lens block; G2 . . . middle-group lens block; G3 . . . rear-group lens block; M13 . . . free-form surface mirror; S1 (20) . . . stop; and 21 and 22 . . . lens barrel.

The invention claimed is:

1. A projection lens assembly method in an oblique projection optical system for an oblique type projection image display apparatus, the oblique type projection image display apparatus having a block including a spherical lens and a block including an aspherical lens, the method comprising:
    preparing a plurality of first blocks, each of the blocks including a spherical lens having a size adapted to one of a plurality of image display elements each of which has a different size;
    preparing a second block including a common aspherical lens adapted to the plurality of image display elements;
    selecting a first block from the plurality of first blocks, the selected first block including the spherical lens having a size adapted to an image display element of the plurality of image display elements that is to be incorporated in the projection image display apparatus; and
    assembling the selected first block and the second block including the common aspherical lens.

2. The projection lens assembly method according to claim 1, further comprising:
    preparing a plurality of mirrors, each of the mirrors having a size adapting to each of the image display elements;
    selecting a mirror from the plurality of mirrors, the selected mirror adapted to the incorporated image display element in the projection image display apparatus; and
    assembling the selected first block, the second block, and the selected mirror from the mirrors.

3. The projection lens system assembly method according to claim 1,
    Wherein each of the plurality of first blocks includes the spherical lens and an aperture stop therein,
    the spherical lens includes a front-group lens block incorporated in front of the aperture stop along an optical axis and a middle-group lens block incorporated in back of the aperture stop, and
    the selected first block includes one or both of the front-group lens block and the middle-group lens block adapting to the size of the incorporated image display element in the projection image display apparatus.

4. A projection image display apparatus incorporating an oblique type projection image display apparatus in a housing, the oblique type projection image display apparatus comprising: a light source; an image display element modulating an intensity of light from the light source in accordance with an image signal; and a projection lens through which modulated image light from the image display element is obliquely projected onto a projection surface,
    wherein the projection lens includes:
        a plastic lens having a spherical lens disposed at a position nearest to the image display element and an aspherical surface located on a side of an aperture stop of the spherical lens; and
        a mirror disposed at a position nearest to the projection surface,
    the plastic lens is formed by combining a plurality of lens blocks incorporated in front and back of the aperture stop of the projection lens along an optical axis, and
    the projection lens is assembled by the projection lens assembly method according to claim 1.

* * * * *